United States Patent [19]

Shiozaki et al.

[11] Patent Number: 4,754,156

[45] Date of Patent: Jun. 28, 1988

[54] CONTROL APPARATUS FOR VARIABLE-SPEED HYDRAULIC POWER GENERATING SYSTEM

[75] Inventors: Junichi Shiozaki; Akira Bando; Takao Kuwabara, all of Hitachi; Eiji Haraguchi, Ibaraki; Hiroto Nakagawa, Osaka, all of Japan

[73] Assignees: Hitachi, Ltd., Tokyo; The Kansai Electric Power Co., Inc., Osaka, both of Japan

[21] Appl. No.: 109,167

[22] Filed: Oct. 16, 1987

[30] Foreign Application Priority Data

Oct. 17, 1986 [JP] Japan ................................. 61-245258

[51] Int. Cl.[4] ............................................. F01D 15/10
[52] U.S. Cl. .................................. 290/52; 290/40 C; 290/43; 415/5; 415/7; 60/499; 60/500; 417/331; 417/332
[58] Field of Search ....................... 290/42, 43, 44, 45, 290/52, 53, 54, 55, 40 C; 318/586, 588, 589; 415/1, 2, 3, 4, 5, 6, 7; 416/3, 7, 9, 119, 132 B; 417/330-333; 60/495-509; 322/29, 35

[56] References Cited

U.S. PATENT DOCUMENTS

| | | | |
|---|---|---|---|
| 4,089,287 | 5/1978 | Kranert et al. | 318/588 X |
| 4,258,270 | 3/1981 | Tornkvist | 290/53 |
| 4,287,429 | 9/1981 | Bashnin et al. | 290/40 C |
| 4,546,264 | 10/1985 | Pinson | 290/42 X |
| 4,694,189 | 9/1987 | Haraguchi et al. | 290/40 C |

FOREIGN PATENT DOCUMENTS 48-21045  3/1973  Japan .
52-46428  4/1977  Japan .
55-56499  4/1980  Japan .
59-72998  4/1984  Japan .

OTHER PUBLICATIONS

"Handbook of Electrical Engineers", p. 734, Japan.

*Primary Examiner*—William M. Shoop, Jr.
*Assistant Examiner*—Paul Ip
*Attorney, Agent, or Firm*—Fay, Sharpe, Beall, Fagan, Minnich & McKee

[57] ABSTRACT

Disclosed is a control apparatus for a variable-speed hydraulic power generating system comprising a variable-speed a.c. electric generator connected to an a.c. electric power system and a hydraulic machine system including a water turbine for driving the generator and a guide vane for controlling an amount of water supplied to the water turbine. The control apparatus comprises a frequency converter connected between the electric power system and the generator for controlling electric power supplied from the generator to the electric power system, control means operating in response to at least an externally applied power generation command signal for controlling, on one hand, the frequency converter thereby controlling the electric power supplied from the generator to the electric power system and generating, on the other hand, a guide-vane opening command signal for controlling the guide vane thereby controlling the amount of water supplied to the water turbine, and means for reducing resonance which may occur in the hydraulic machine system when the rotation speed of the water turbine changes in response to a change of the externally applied power generation output command signal.

5 Claims, 4 Drawing Sheets

CONTROL APPARATUS FOR VARIABLE-SPEED HYDRAULIC POWER GENERATING SYSTEM

BACKGROUND OF THE INVENTION

1. Field of the Invention

This invention relates to a control apparatus for a variable-speed hydraulic power generating system, which controls the opening of a guide vane for controlling the operation of a water turbine so as to rotate the water turbine at an optimum rotation speed.

2. Description of the Related Art

One of principal objects of controlling the rotation speed of a rotary electric machine is to control the rotation speed of a turbo-machine such as a reversible pump-turbine according to the load of the turbo-machine thereby achieving the operation of the turbo-machine at the highest efficiency. A water turbine in a hydraulic power generating system is operated at a variable speed by one of two broadly classified methods.

According to the first method, a frequency converter is provided between an a.c. system and an electric generator. JP-A-48-21045 proposes a method according to which electric power can be supplied to an a.c. system regardless of operation of an electric generator at any rotation speed, and a guide vane of a water turbine is suitably opened and closed to regulate the rotation speed of the water turbine thereby achieving the operation of the water turbine at the point of its highest efficiency.

According to the second method, a wound-rotor induction machine is connected at its primary side to an a.c. system, and a frequency converter is provided between the a.c. system and the secondary side of the induction machine. This method was already known as a typical application of a method in which a wound-rotor induction machine is connected at its primary side to an a.c. system and has a frequency converter connected between its secondary side and the a.c. system so as to control the rotation speed of a water turbine according to the generator output. Such a method is described in, for example, "Handbook of Electrical Engineers" Part 14, Section 5.4.2 (d) in page 734 published by the Institute of Electrical Engineers of Japan in 1967. A control apparatus for such a variable-speed hydraulic power generating system is proposed in, for example, JP-A-52-46428, JP-A-55-56499 or JP-A-59-72998.

The problem common to the two kinds of control apparatus for variable-speed hydraulic power generating systems as described above is how the water turbine output and the electric generator output are to be controlled for controlling the rotation speed of the water turbine. More concretely, an optimum rotation speed Na is calculated on the basis of signals commanding operating conditions of the water turbine, which signals include at least an externally applied power generation command signal Po, and the calculated optimum rotation speed Na is compared with an actually detected value N of the rotation speed of the water turbine to obtain a speed error signal (Na−N). The problem is how this speed error signal (Na−N) is used for controlling both the water turbine output and the electric power generator. The power generation command signal Po is externally applied from a central load-dispatching office which determines the power output to be generated by the hydraulic power generating system on the basis of the power demanded by an a.c. electric power system to which the hydraulic power generating system is connected.

In connection with a control apparatus based on the second method described above in which a wound-rotor induction machine is connected at its primary side to an a.c. system and has a frequency converter connected between its secondary side and the a.c. system for controlling the operation of a water turbine in a variable-speed hydraulic power generating system, it is disclosed in U.S. Pat. No. 4,694,189 issued Sept. 15, 1987, granted on U.S. patent application Ser. No. 911,131 to control, on one hand, the power generation by a generator excitation control unit on the basis of a power generation command signal Po and to control, on the other hand, the opening of the guide vane of the water turbine on the basis of a speed error signal (Na−N).

In the control apparatus of the kind described above, the power generation increases while substantially following up the power generation command signal Po which is a stepwise increasing signal. However, the response of the guide vane opening control to the speed error signal (Na−N) is slow relative to the response of the power generation control to the power generation command signal Po. Therefore, the increase in the water turbine output is delayed relative to the increase in the power generation, with the result that the rotation speed of the water turbine is temporarily decreased to increase the value of the speed error signal (Na−N), thereby tending to further increase the opening of the guide vane. Thus, the response of the water turbine output under control of the mechanical system is slow relative to the response of the power generation under control of the electrical system. Therefore, in some cases, undesirable resonance may possibly occur in the mechanical system. Occurrence of such resonance in the mechanical system may result in build-up of an unusually high water pressure in the penstock to the water turbine thereby giving rise to a great variation of the rotation speed of the water turbine. Also, since the resonance frequency is low, the power generation may vary in the vicinity of the low resonance frequency to such an extent that it cannot follow up the generation output command.

SUMMARY OF THE INVENTION

The present invention is relating to a control apparatus for a variable-speed hydraulic power generating system comprising a variable-speed electric generator connected to an a.c. electric power system and a hydraulic machine system including a water turbine for driving the generator and a guide vane for controlling an amount of water supplied to the water turbine, the control apparatus comprising a frequency converter connected between the electric power system and the generator for controlling electric power supplied from the generator to the electric power system, and control means operating in response to input signals including at least an externally applied power generation command signal for controlling, on one hand, the frequency converter thereby controlling the electric power supplied from the generator to the electric power system and controlling, on the other hand, the guide vane thereby controlling the amount of water supplied to the water turbine, and has an object to provide the control apparatus for the variable-speed hydraulic power generating system of the above-mentioned type will means for reducing resonance of the hydraulic machine system which resonance is attributable to a change in the rotation speed of the water turbine due to a change in the externally applied power generation command signal.

According to the present invention which attains the above object, the control apparatus for the variable-speed hydraulic power generating system of the type described above comprises, as the resonance reducing means, means for detecting a water pressure applied to the water turbine and means for correcting, according to a variation of the detected water pressure, a signal produced by the control means to control the opening of the guide vane.

DESCRIPTION OF THE PREFERRED EMBODIMENTS

A preferred embodiment of the present invention will now be described with reference to the accompanying drawings.

Figure 1:
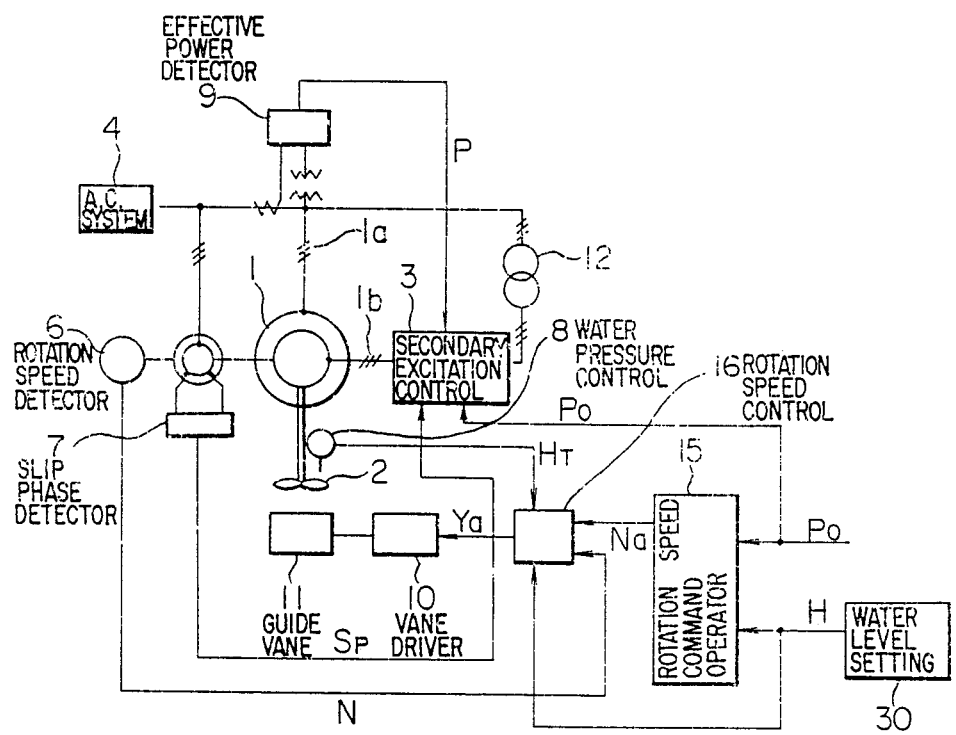
FIG. 1 is a block diagram showing the structure of a preferred embodiment of the control apparatus for a variable-speed hydraulic power generating system according to the present invention.

Referring to FIG. 1, an induction generator 1 is rotated by a water turbine 2 directly coupled to its rotor. An a.c. exciting current whose phase is regulated to a predetermined one corresponding to the rotation speed is supplied to a secondary winding 1b of the induction generator 1 from a secondary excitation control unit 3 including a frequency converter, and the induction generator 1 rotates at a variable speed so that a.c. electric power having the same frequency as that of an a.c. electric power system 4 is generated from a primary winding 1a of the induction generator 1. A slip phase detector 7 detects a slip phase $S_P$ equal to the difference between the voltage phase of the a.c. electric power system 4 and the rotation phase of the secondary side of the induction generator 1 expressed in terms of an electrical angle. In one form of the slip phase detector 7, its rotor includes three-phase windings connected in parallel with the primary winding 1a of the induction generator 1, and its stator is provided with a pair of Hall converters spaced from each other by $\pi/2$ in electrical angle. A signal representing the voltage phase of the a.c. electric power system 4 when viewed from the secondary side of the induction generator 1 is detected by the Hall converters and converted into a slip phase signal $S_P$.

An externally applied power generation command signal Po is directly applied as an induction-generator output command signal $P_G$ to the secondary excitation control unit 3 together with the slip phase signal $S_P$ applied from the slip phase detector 7. An effective power detector 9 detects an output current of the induction generator 1, and its output signal P indicative of the detected output current is also applied to the secondary excitation control unit 3. The secondary excitation control unit 3 controls the a.c. exciting current supplied to the secondary winding 1b of the induction generator 1 so that the signal P indicative of the detected output current of the induction generator 1 becomes equal to the induction-generator output command signal $P_G$. For the purpose of this control, a control method proposed in, for example, Japanese Patent Publication No. 57-60645 (1982) can be applied. A rotation speed command operator 15 generates an optimum rotation speed command signal Na in response to the external application of the power generation command signal Po together with an effective water level signal H applied from a water level setting unit 30. When the variation of the effective water level used in the hydraulic power generating system is very slow, the water level signal H is fixed, and the power generation command signal Po only is used, as a variable, to generate the optimum rotation speed command signal Na. However, the water level signal H may be adjusted periodically or at any time as desired. A rotation speed detector 6 detects the rotation speed of the water turbine 2 and generates an output signal N indicative of the detected rotation speed. A rotation speed control unit 16 generates a guide-vane opening command signal Ya which is applied through a guide vane driver 10 to a guide vane 11. The optimum rotation speed command signal Na is applied to the rotation speed control unit 16 together with the detected water-turbine rotation speed signal N applied from the rotation speed detector 6. The structure described above is similar to that disclosed in U.S. Pat. No. 4,694,189.

In the present invention, a water pressure detector 8 detecting a water pressure H applied to the water turbine 2 is further provided, and its output signal $H_T$ indicative of the detected water pressure is also applied to the rotation speed control unit 16. The water level signal H is also applied to the rotation speed control unit 16. This signal H is normally fixed but periodically adjusted as described already. The signal H indicates a water pressure measured at the water inlet of the water turbine 2, and adjusted such that when the flow rate of water is constant, the water pressure signal H is substantially equal to the water level H regardless of the level of the flow rate of water.

Figure 2A:
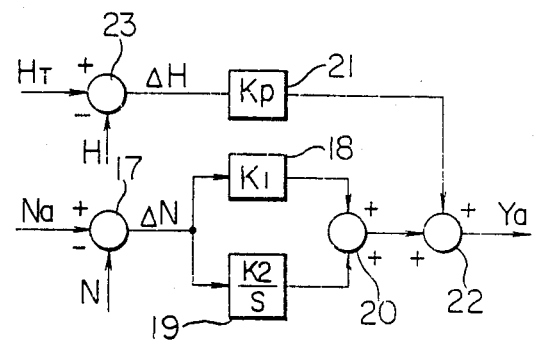
FIGS. 2A and 2B are block diagrams showing two examples respectively of the signal transfer characteristics of the water-turbine rotation speed. control unit controlling the opening of guide vane.

FIG. 2A shows the structure of the rotation speed control unit 16. Referring to FIG. 2A, the detected water-turbine rotation speed signal N is compared in a comparator 17 with the rotation speed command signal Na, and the error signal $\Delta N$ ($=Na-N$) is applied to both of a proportional element 18 and an integration element 19. The output signals of these elements 18 and 19 are applied to an adder 20, and the resultant output signal of the adder 20 is applied as a first input to another adder 22. On the other hand, the detected water pressure signal $H_T$ is compared in another comparator 23 with the water level signal H, and the error signal $\Delta H$ ($=H_T-H$) is applied to another proportional element 21. The output signal of the proportional element 21 is applied as a second input to the adder 22. The resultant output signal of the adder 22 provides the guide-vane opening command signal Ya. Thus, by adjusting the level of the water level signal H and that of the water pressure signal $H_T$ so that the pressure error $\Delta H$ is null when the flow rate of water supplied to the water turbine 2 is constant, the guide vane opening can be corrected only in a transient state of the water turbine operation.

Figure 2B:
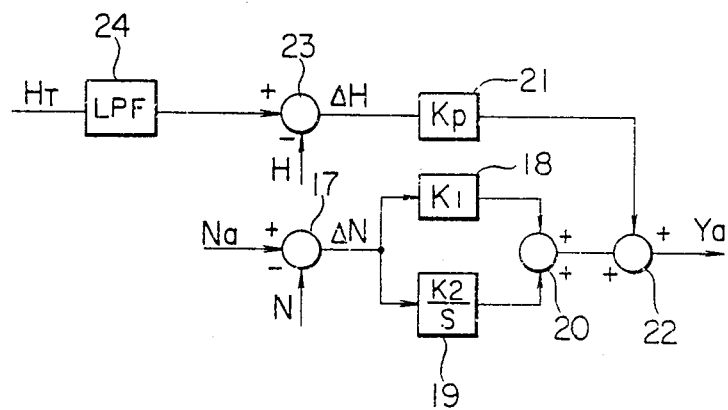

FIG. 2B is a modification of the rotation speed control unit 16 shown in FIG. 2A. In this modification, a low-pass filter 24 is provided to remove higher harmonic frequency components of the water pressure signal $H_T$, and such an output signal of the LPF 24 is used for the calculation of the pressure error $\Delta H$. Thus, frequency components having frequencies higher than the resonance frequency of the water conduit system, such as those attributable to water pressure pulsations appearing at the guide vane 11 can be removed.

Figure 3:
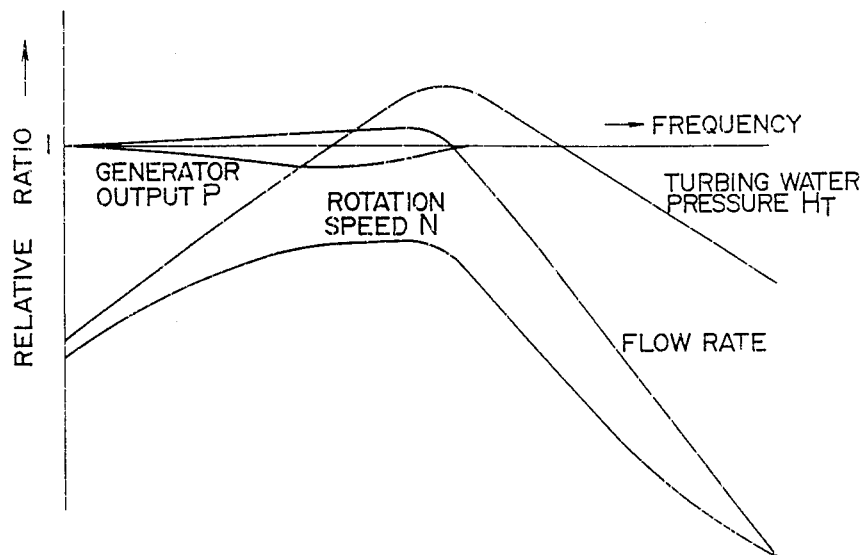
FIGS. 3 and 4 are graphs showing responses of the generator output, the rotation speed of the water turbine and the water pressure applied to the water turbine to a change in the power generation command signal in the control apparatus of the present invention and a prior art apparatus respectively.
Figure 4:
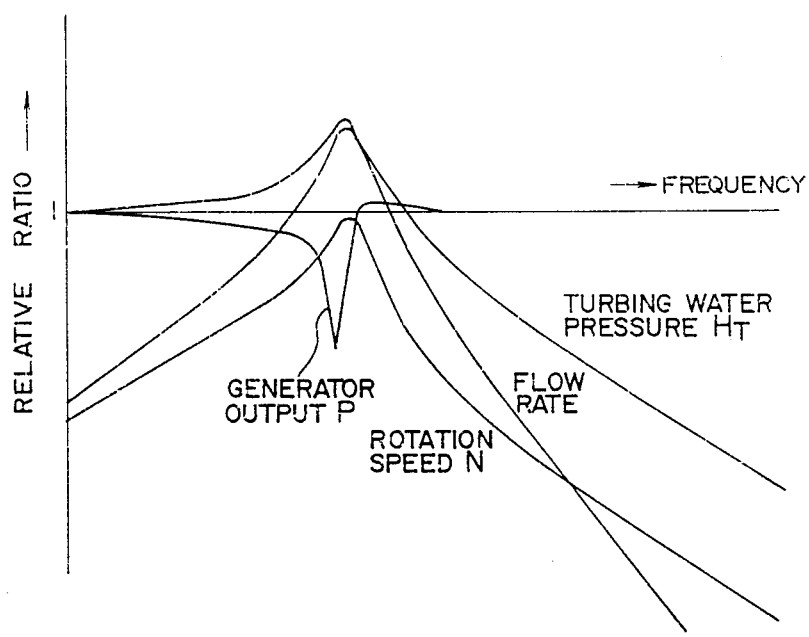

FIG. 3 is a graph showing frequency response characteristics of the generator output P, the water turbine rotation speed N, the flow rate of water supplied to the water turbine 2 and the water pressure $H_T$ applied to the water turbine 2, when the power generation command signal Po including a variable component of a sinusoidal waveform is applied to a control apparatus of the present invention which comprises the rotation speed control unit 16 having a structure as shown in FIG. 2A and the frequency of the sinusoidal waveform of the variable is changed. FIG. 4 shows, for the sake of comparison, similar frequency response characteristics in a prior art apparatus which operates without the feedback of the water pressure applied to the water turbine. In each of FIGS. 3 and 4, the horizontal axis represents the frequency in sinusoidal variation of the power generation command signal Po and the vertical axis represents the relative ratios, that is, the rates in change of the various parameters relative to the rate in change of the power generation command signal Po. More particularly, assuming that the power generation command signal is changed by $\Delta P$ from the nominal value P to obtain a resultant command signal $Po = Poo + \Delta Po$, the rate in change of the power generation command signal is represented by $\Delta Po/Poo$. On the other hand, if a given parameter is at its nominal value Roo when the power generation command signal is Poo, and changed to $Ro = Roo + \Delta Ro$, when the power generation command signal is changed as above-mentioned, the rate in change of the parameter is given by $\Delta Ro/Roo$. The generator output P and the flow rate of water should ideally change at the same rate as the rate in change of the power generation command signal Po. Therefore, it is desirable that the relative ratios should have a value equal to 1 (unity) regardless of any frequency in change of the power generation command signal Po. On the other hand, the water pressure $H_T$ applied to the water turbine 2 and the rotation speed N of the water turbine 2 should ideally be maintained constant even when the frequency in change of the power generation command signal Po. Therefore, it is desirable that the relative ratios have a small value preferably smaller than 1 (unity) regardless of any frequency in change of the power generation command signal Po.

FIG. 3 will now be compared with FIG. 4. In the case of FIG. 3 showing the frequency response characteristics of the embodiment of the present invention, any appreciable reduction of the generator output P does not occur, and the relative ratio is maintained at a value approximately equal to 1 (unity). Further, undesirable resonance of the mechanical system, which is attributable to the fact that the relative ratios of the water-turbine water pressure $H_T$, the water flow rate and the water-turbine rotation speed N show an abrupt increase at a certain frequency range in variation of the power generation command signal Po, also disappears. Further, the range where the relative ratio of the water flow rate has a value approximately equal to 1 (unity) is extended to a high frequency range, and the curve gradually goes down with a further increase in the frequency. This means that useless interchange between the kinetic energy of water in the penstock and the rotation energy of the mechanical system, i.e. useless variation of the rotating speed of the mechanical system is reduced so that the frequency range in which the kinetic energy of water is efficiently converted into the electrical energy, is widened, so that, even when the power generation command signal Po changes stepwise, the mechanical system can quickly respond to the command without causing any overshoot in the rotation speed of the water turbine 2.

Figure 5:
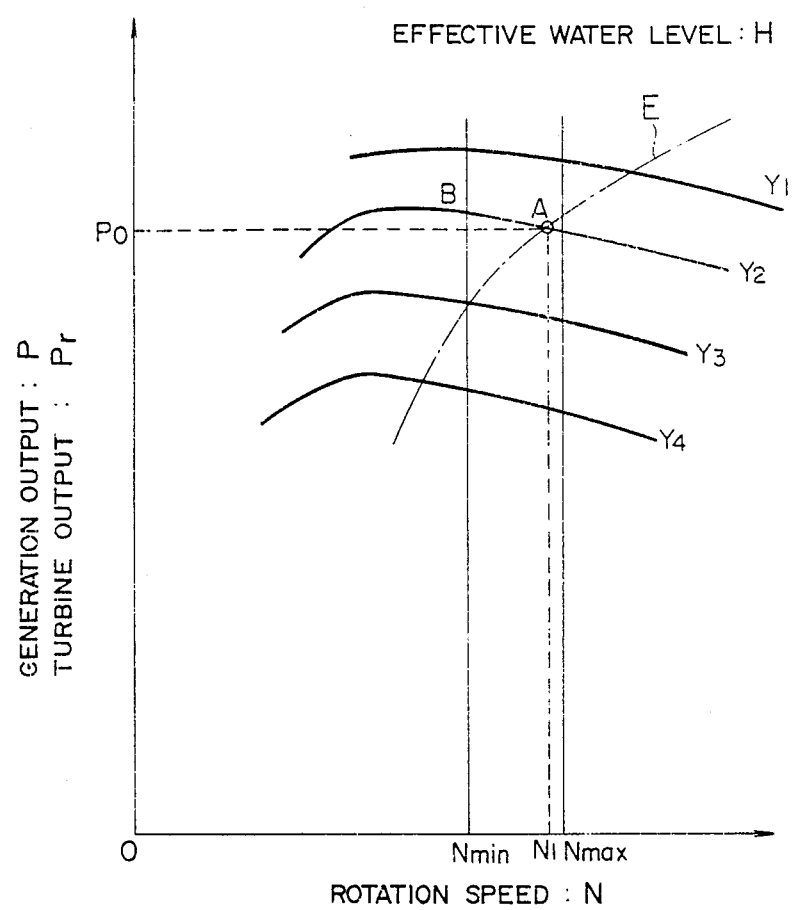
FIG. 5 is a graphic illustration of the operation of the rotation speed command operator shown in FIG. 1.

The structure of the rotation speed command operator 15 is commonly known, and its detailed description will be unnecessary. The operation of the rotation speed command operator 15 will be briefly described with reference to FIG. 5. In response to the application of the power generation command signal Po and the effective water level signal H, the rotation speed command operator 15 generates the rotation speed command signal Na. Since the effective water level does not actually rapidly change, the water level signal H is normally fixed and adjusted periodically or at any time as desired. FIG. 5 is a graph showing the relation between the output $P_T$ and the rotation speed N of the water turbine 2 using the guide vane opening as a parameter. The curve E represents the water turbine rotation speed N providing the highest turbine efficiency relative to the turbine output $P_T$. Reference symbols Nmax and Nmin designate the maximum and minimum allowable rotation speeds respectively of the water turbine 2. When the scale of the vertical axis of FIG. 5 is calibrated by the ratio of the generator output P to the turbine output $P_T$, that is, the power generation efficiency, FIG. 5 can also show the relation between the generator output P and the turbine rotation speed N. The rotation speed command operator 15 is constructed so that a signal indicative of a rotation speed $N_1$ corresponding to a point A giving the highest efficiency in response to the power generation command signal Po in the range between the point Nmax and the point Nmin is generated as the rotation speed command signal Na. Thus, the rotation speed command operator 15 may include, for example, a microcomputer having a memory including a table for each of various values of the water level H, showing values of the turbine rotation speed N giving the highest efficiency with respect to various different values of the power generation command signal Po, respectively, at that water level. In the microcomputer, the value of the turbine rotation speed N corresponding to the value of the power generation command signal Po applied at that moment is read out from the table provided in the memory for the water level given at that moment, so as to generate the required rotation speed command signal Na corresponding to the rotation speed value N read out from the table. The rotation speed control unit 16 may be similarly constructed. That is, on the basis of the relation shown in FIG. 5, a table showing various values of the guide vane opening Y with respect to various different values of the turbine rotation speed N respectively is prepared, and the value of the guide vane opening Y corresponding to the value of the rotation speed command signal Na generated from the rotation speed command operator 15 is read out from the table to find the value of the guide vane opening Y. This value of the guide vane opening Y is then suitably corrected on the basis of the detected value of the turbine water pressure $H_T$ to generate the required guide-vane opening command signal Ya.

In the embodiment of the present invention described above, an induction generator of secondary excitation type is used as a variable-speed electric generator, and a frequency converter is provided between an a.c. electric power system and a secondary excitation winding of the induction generator, so that current supplied from the frequency converter to the secondary exciting winding can be controlled on the basis of a power generation command signal. However, the present invention is similarly effectively applicable to a variable-speed hydraulic power generating system in which a synchronous generator is used as a variable-speed electric generator, and a frequency converter is connected between an a.c. electric power system and a primary winding of the synchronous generator, so that output current of the synchronous generator can be controlled through the frequency converter on the basis of a power generation command signal.

We claim:

1. A control apparatus for a variable-speed hydraulic power generating system comprising a variable-speed electric generator electrically connected to an a.c. electric power system and a hydraulic machine system including a water turbine for driving the generator and a guide vane for controlling an amount of water supplied to the water turbine, said control apparatus comprising:
   a frequency converter connected between said electric power system and said generator for controlling electric power supplied from said generator to said electric power system;
   control means operating in response to input signals including at least an externally applied power generation command signal for controlling, on one hand, said frequency converter thereby controlling the electric power supplied from said generator to said electric power system and generating, on the other hand, a guide-vane opening command signal for controlling said guide vane thereby controlling the amount of water supplied to said water turbine;
   means for detecting a water pressure applied to said water turbine; and
   means for correcting said guide-vane opening command signal according to a variation of said detected water pressure.

2. A control apparatus according to claim 1, wherein said electric generator is an induction generator of secondary excitation type, and said frequency converter is connected between said electric power system and a secondary excitation winding of said induction generator.

3. A control apparatus according to claim 2, wherein said control means includes means for adjustably setting a signal indicative of the water level of water supply to said water turbine.

4. A control apparatus according to claim 3, wherein said means for detecting the water pressure applied to said water turbine generates an output signal having a level adjusted to correspond to an effective water level of said water supply when the flow rate of water supplied to said water turbine is constant.

5. A control apparatus for a variable-speed hydraulic power generating system comprising a secondary-excitation type induction generator having a primary winding connected to an a.c. electric power system, secondary-excitation control means connected to a secondary winding of the induction generator for controlling the excitation of the secondary winding of the induction generator according to an externally applied power generation command signal thereby controlling the output of said induction generator, a water turbine for driving said induction generator, a guide vane for adjusting an amount of water to be supplied to the water turbine, a rotating speed command operator for determining an optimum rotating speed command signal based on at least said externally applied power generation command signal, means for detecting a rotating speed of said generator, means for producing a guide-vane opening command signal based on a difference between said optimum rotating speed command signal and the detected rotating speed of the generator, means for controlling an opening of the guide vane according to said guide-vane opening command signal, means for detecting a water pressure applied to said water turbine and means for correcting said guide-vane opening command signal according to a variation of said detected water pressure.

* * * * *